United States Patent [19]
Du

[11] Patent Number: 5,715,251
[45] Date of Patent: Feb. 3, 1998

[54] LOCAL NETWORK INCLUDING CONCENTRIC MAIN AND RELIEF RINGS

[75] Inventor: Yonggang Du, Aachen, Germany

[73] Assignee: U.S. Phillips Corporation, New York, N.Y.

[21] Appl. No.: 207,524

[22] Filed: Mar. 7, 1994

[30] Foreign Application Priority Data

Mar. 8, 1993 [DE] Germany ............... 43 07 174.0

[51] Int. Cl.$^6$ ................................................. H04J 3/02
[52] U.S. Cl. ................. 370/404; 370/401; 370/405
[58] Field of Search ........................ 370/85.12, 85.13, 370/85.14, 85.15, 28, 16.1, 94.1, 60, 68, 401, 402, 403, 404, 405, 285, 222, 422, 394, 376

[56] References Cited

U.S. PATENT DOCUMENTS

| | | | |
|---|---|---|---|
| 4,587,651 | 5/1986 | Nelson et al. | 370/68 |
| 4,975,906 | 12/1990 | Takiyasu et al. | 370/85.13 |
| 5,163,047 | 11/1992 | Perdikaris et al. | 370/85.13 |
| 5,220,562 | 6/1993 | Takada et al. | 370/85.13 |
| 5,251,213 | 10/1993 | Videlock et al. | 370/85.14 |
| 5,337,311 | 8/1994 | Herzberg et al. | 370/85.14 |
| 5,490,252 | 2/1996 | Macera et al. | 370/60 |

OTHER PUBLICATIONS

"Register–Insertion: A Protocol For The Next Generation of Local–Area Networks" El-Din et al, Computer Networks and ISDN Systems 24 (1992).

Primary Examiner—Douglas W. Olms
Assistant Examiner—Shick Hom
Attorney, Agent, or Firm—David R. Treacy

[57] ABSTRACT

A local network for connecting a plurality of stations includes a main ring which is formed by a number of network interfaces coupled via main ring lines, which network interfaces are each coupled to a respective one of the stations, and a first relief ring, which is formed by a number of bridge elements coupled in series via relief ring lines. The relief ring is coupled to the main ring. At least one bridge element is provided for establishing a connection between the first relief ring and the main ring.

21 Claims, 2 Drawing Sheets

LOCAL NETWORK INCLUDING CONCENTRIC MAIN AND RELIEF RINGS

BACKGROUND OF THE INVENTION

The invention relates to a local network comprising a plurality of stations and a main ring formed by main ring lines and network interfaces which interfaces are each coupled to a station.

In local networks the payload can be transmitted, for example, in synchronous or asynchronous time-division multiplex technology in digital signals. In asynchronous time-division multiplex technology, for example, the register insertion method or the token method is used (see B. Walke: "Datenkommunikation I", part 2, Dr. Alfred H üthig Verlag, Heidelberg, 1987, p. 146). Packets are then transmitted over the local network between the individual stations.

A local network operating network according to the register insertion method is known, for example, from the publication "Register-insertion: A protocol for the next generation of ring local-area networks" by W. H. Bahaa-El-Din and M. T. Liu, Computer Networks and ISDN Systems 24 (1992), North-Holland, pp. 349 to 366. In this publication, packets from the main ring arriving at the network interface are written either into an input buffer or into a shift register. Packets in the input buffer are transferred to the station. Packets coming from the station are written into an output buffer of the network interface. The packets stored in the output buffer and shift register are fed to the ring.

Furthermore, there are local networks operating in the asynchronous transfer mode. For example, such a network is known from the publication entitled "Ohne Chips nichts los—Standard-Chips für ATM-Systeme sind im Kommen" by Bernd Reder, Elektronik 1/1993, pp. 66 to 75. In this paper, which gives a general view, the current development of integrated circuits used in local networks is discussed, which networks operate in the asynchronous transfer mode (ATM). Each station is then connected to the ring lines of the local network via network interfaces. Switches are used in the network interfaces to control the ATM cell stream.

When an asynchronous transfer mode is used in a system, payload, for example, telephone, picture or sound signals are sent in blocks of fixed lengths through arrangements for digital signal processing. A block of fixed length is denoted as a cell which contains a given number of bytes (for example, 53 bytes). Such a cell can be serially transferred over the digital arrangements i.e. bit by bit, or in parallel i.e. byte by byte. Each cell contains a header field having a length of, for example, 5 bytes, and an information field which accommodates the payload and has a length of, for example, 48 bytes. In such a header field are available routing identification codes, error recognition data and control data. Routing identification codes are meant to be understood as trunk identifiers and link identifiers. The link identifier, aim referenced VCI (Virtual Channel Identifier), contains the description of the destination of the cell in the system. For transmitting a cell, a virtual channel is made available on account of the virtual channel identifier. As a rule, a VCI is changed each time an exchange is reached. A trunk group of various virtual channels is referenced a virtual path. A virtual path is featured by the trunk identifier. Such a virtual path is called a Virtual Path Identifier (VPI). Cells are assigned to consecutively determined periods of time. The length of such a period of time depends on the clock rate used as a basis of the switch components. If no payload is available, empty cells i.e. cells without payload, are transmitted in such a period of time. Cells containing payload are referenced payload cells.

In all the local networks defined above the transmission rate of the packets or signals is determined by the frequency of the clock signal that determines the transmission and by the traffic load.

It is an object of the invention to provide a local network in which the transmission rate of the packets or signals is increased without the frequency of the clock signal determining the transmission likewise being increased.

SUMMARY OF THE INVENTION

This object is achieved by a local network of the type defined in the opening paragraph, in that a first relief ring comprising relief ring lines and bridging elements, is coupled to the main ring, in that the bridging elements are each arranged between specific network interfaces and in that a bridging element is provided for establishing a connection between the first relief ring and the main ring.

In the local network a first relief ring is added to the main ring which comprises main ring lines and network interfaces. This relief ring comprises relief ring lines and bridging elements. The bridging elements establish a connection between the main ring and the relief ring. Two consecutive bridging elements in the relief ring bridge at least one network interface. However, it is also possible, for example, for four network interfaces to be bridged. The first one of the four network interfaces is then coupled to a first output of a first bridging element and the fourth of the consecutive network interfaces is coupled to a first input of a second bridging element. The second output of the first bridging element and the second input of the second bridging element are interconnected. The number of bridging elements of the first relief ring is in consequence smaller than the number of network interfaces of the main ring. The bridging elements transfer signals or packets from the main ring to the relief ring and vice versa. As a result, the transfer rate of the packets or signals is increased without the frequency of the clock signal determining the transmission likewise being increased.

If each station and network interface is arranged for transmitting and receiving packets containing payload and the packet destination, the following simple distribution strategy can be utilized in a bridging element: a bridging element is arranged for transferring a packet received from an input relief ring line or an input main ring line to an output main ring line if the packet destination is a station of the connected segment. A segment is formed by the network interfaces and assigned stations arranged between two bridging elements of the first relief ring. The bridging element transfers a packet from an input relief ring line or an input main ring line to the output relief ring line if the packet destination is not found in the segment which is connected to the output main ring line of the bridging element.

Assuming that there is a symmetrical load i.e. each network interface or station respectively, receives the same mean load, a uniform load distribution in the local network is obtained if the segments of the main ring comprise about the same number of network interfaces and assigned station. If the number of bridging elements $B_{1j}$ is M in this case, the mean overall traffic load in this segment is still Q/M with an overall load of Q. Each segment packets only transports packets to or from the assigned stations and no packets from the other segments (M−1). Thus in the main ring the overall load Q is reduced by the factor of 1/M under the assumption that in each segment of the main ring there are about the same number of network interfaces and there is a symmetrical load.

A further increase of the transfer rate of the packets of the local network is obtained by adding further relief rings. In that case the further relief rings containing relief ring lines and bridging elements are then coupled each to the first relief ring and coupled to each other. The bridging elements of a further relief ring are inserted between specific bridging elements of the higher-order relief ring arranged closer to the main ring. A bridging element of a further relief ring is provided for forming a connection between two neighbouring relief rings.

One or more bridging elements of the higher-order relief ring are bridged by two interconnected bridging elements of a lower-order further relief ring. Such a number of bridging elements of a higher-order relief ring bridged by two bridging elements of a lower-order relief ring also form a segment. A higher-order relief ring thus comprises at least one bridging element more than the lower-order relief ring. If the segments of a relief ring comprise about the same number of bridging elements and if there is a symmetrical load, a uniform load distribution can be obtained.

In the further relief rings, the following simple packet distribution strategy can be carried out: A bridging element of a further relief ring is arranged to transfer a packet received from an input relief ring line to an output relief ring line of a higher-order relief ring if the transfer of the packet from the output relief ring line to the destination can take place over a minimum number of bridging elements of a higher-order relief ring.

The packet destination is usually a station or a network interface. A packet is thus fed from a further relief ring to a higher-order relief ring via a bridging element, if the packet is applied direct without further subsequent bridging elements to the segment of the main ring, which segment comprises the addressed station or network interface.

Assuming that there is a symmetrical load, there is a uniform load distribution if the segments of a relief ring have about the same number of bridging elements. There is a favourable load distribution if a lower-order relief ring has one bridging element less than the higher-order relief ring. As shown hereinbefore, with a mean load supplied through the first relief ring, the main ring has an overall load of Q/M. The first relief ring then has an overall load of (M–1)Q/M, if there is no relief through further relief rings. If the second relief ring, which has a lower-order than the first relief ring, has (M–1) bridging elements $B_{2i}$ (the second relief ring has one bridging element less than the first relief ring), the overall load of the first relief ring is reduced to (M–1)Q/M/ (M–1)=Q/M. To load the further relief rings also with an overall load of Q/M, a total of M–1 relief rings are to be available. The (M–1)$^{th}$ relief ring then comprises two bridging elements.

Via such a local network it is also possible to transfer cells which are generated at least by the stations or the network interfaces in the asynchronous transfer mode.

A bridging element of a local network operating in the asynchronous transfer mode, always comprises a demultiplexer for each input ring line for the extraction of the address from the header field of an incoming cell and for transferring this cell to multiplexers for each output ring line in response to the address. The demultiplexers and multiplexers may be formed, for example, by stages described in German Patent Applications 40 12 768 and 37 43 685.

The demultiplexers are always coupled to a memory containing a routing Table. Each demultiplexer is arranged for assigning the address of a cell to a multiplexer via the routing Table. The demultiplexer then learns from the routing Table whether a cell is to be applied to the multiplexer which is connected to a ring line of the lower-order or of the higherorder relief ring or to the main ring respectively.

The routing Table can be updated, for example, when there is a reordering of the local network, by exchanging components over a control line which is connected to a control computer and also to the memory. However, there is also the possibility of updating by means of cells which are supplied, for example, by a station and contain control information. For this purpose, a bridging element comprises a controller for supplying a cell containing control information. The controller updates the routing Table in response to the control information.

BRIEF DESCRIPTION OF THE DRAWINGS

The present invention will now be described, by way of example, with reference to the accompanying drawings, wherein.

DETAILED DESCRIPTION OF THE PREFERRED EMBODIMENTS

Figure 1:
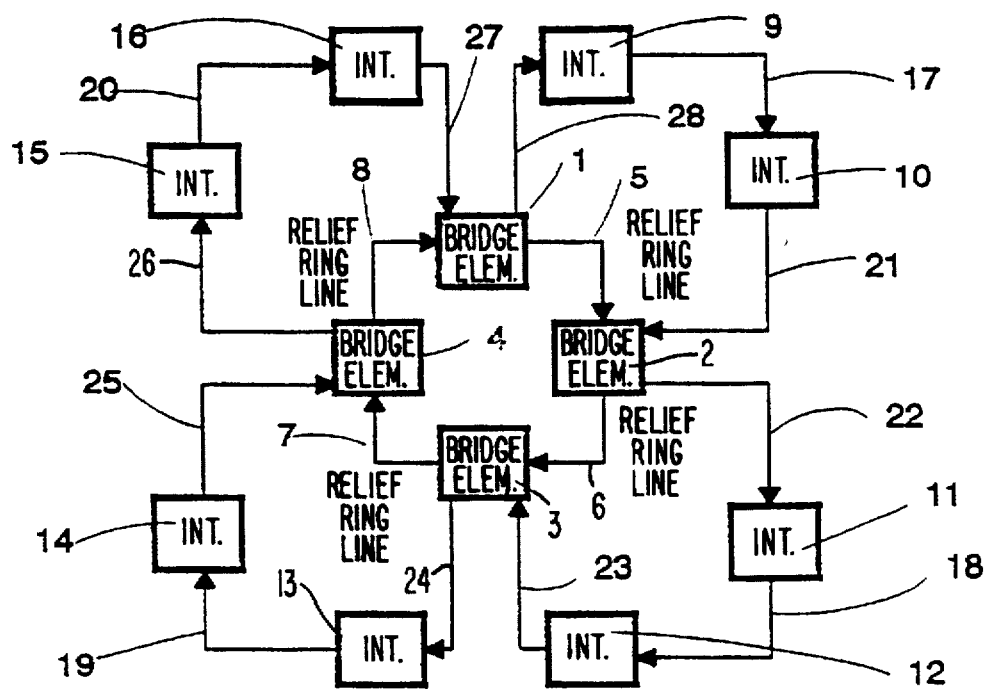
FIG. 1 shows a local network comprising a main ring and a first relief ring.

FIG. 1 shows a local network according to the invention comprising a main ring and a first relief ring. The first relief ring comprises four bridging elements 1 to 4 which are connected to one another via relief ring lines 5 to 8. The main ring comprises eight network interfaces 9 to 16 which are each coupled to assigned stations (not shown here). The network interfaces 9 and 10 are connected to each other via a main ring line 17, the network interfaces 11 and 12 via a main ring line 18, the network interfaces 13 and 14 via a main ring line 19 and the network interfaces 15 and 16 via a main ring line 20. The network interface 10 is connected to an input of the bridging element 2 via a further main ring line 21 and the output of the bridging element 2 is connected to the network interface 11 via a main ring line 22. The bridging element 3 is connected to the network interfaces 12 and 13 via the respective main ring lines 23 and 24. Between the bridging element 4 and the network interface 14 or 15 respectively, main ring lines 25 and 26 are inserted. Finally, the output of the network interface 16 is connected to an input of the bridging element 1 via a main ring line 27 and the output of the bridging element 1 is connected to an input of the network interface 9 via a main ring line 28.

The local network shown in FIG. 1 works in the asynchronous transfer mode and transfers cells between network interfaces or stations. In its header field a cell contains an address which identifies a certain station or network interface as its addressee. The payload is contained in the information field of the cell. This payload may be data from a work station or from a personal computer or, alternatively, control information from a network interface or a station.

A bridging element 1 to 4 receives on its input a cell either from a preceding bridging element or from a network interface. A bridging element 1 to 4 can feed the cell either to the next bridging element or into the main ring to the next network interface. A bridging element sends a received cell to the main ring line only if a network interface or station located between two bridging elements is the receiver of the cell. For example, the network interfaces 11 and 12 are located between the bridging elements 2 and 3. If the bridging element 2 receives a cell and if this cell is to be sent to the network interface 12 or the assigned station, the bridging element 2 transfers the cell to the main ring line 22. However, if, for example, the network interface 14 is the recipient, the cell is transferred to the relief ring line 6 and further to bridging element 3 which element feeds the cell into the main ring line 24. The network interfaces located between two bridging elements form a segment. Such a segment is realized, for example, by the network interfaces 11 and 12.

A uniform load between the main ring and the first relief ring is ensured, provided that there is a symmetrical load, if the segments comprise about the same number of network interfaces and assigned stations. There is a symmetrical load if each station or network interface receives the same mean load.

Figure 2:
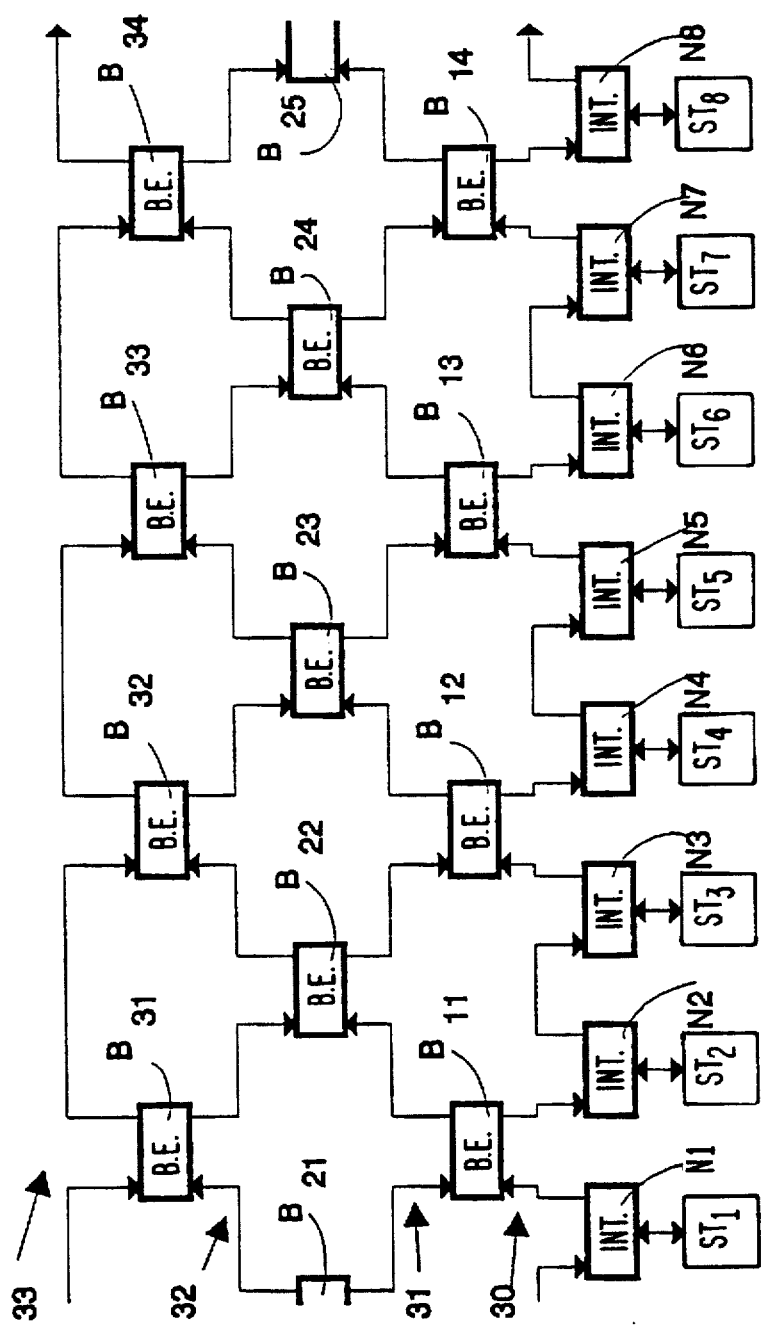
FIG. 2 shows part of a local network comprising a main ring and three relief rings.

An embodiment of part of a local network operating in the asynchronous transfer mode, comprising a main ring 30 and three relief rings 31 to 33 is shown in FIG. 2. The main ring comprises main ring lines and network interfaces. FIG. 2 shows an entirety of eight network interfaces N1 to N8. A double arrow indicates the connection to a station $ST_1$ to $ST_8$ from a network interface N1 to N8. The first relief ring 31 comprises bridging elements and relief ring lines. Four bridging elements $B_{11}$ to $B_{14}$ originate from the bridging elements of the first relief ring 31. The bridging element $B_{11}$ is connected via main ring lines to the network interfaces N1 and N2. The bridging element $B_{12}$ is connected via main ring lines to the network interfaces N3 and N4. Furthermore, there are main ring lines between the bridging elements $B_{13}$ and the network interfaces N5 and N6. The bridging element $B_{14}$ is connected via main ring lines to the network interfaces N7 and N8.

Bridging elements $B_{21}$ to $B_{25}$ are shown in FIG. 2 as belonging to the second relief ring 32. The bridging element $B_{21}$ is connected to the bridging element $B_{11}$ via a ring line of the first relief ring 31. The bridging element $B_{22}$ is connected to the bridging elements $B_{11}$ and $B_{12}$ via ring lines of the first relief ring 31, the bridging element $B_{23}$ to the bridging elements $B_{12}$ and $B_{13}$ via ring lines of the first relief ring 31 and the bridging element $B_{24}$ to the bridging elements $B_{13}$ and $B_{14}$ via ring lines of the first relief ring 31. FIG. 2 shows a further ring line of the first relief ring 31 which ring line is located between the bridging elements $B_{14}$ and $B_{25}$.

FIG. 2 shows four bridging elements $B_{31}$ to $B_{34}$ leaving the third relief ring 33. The bridging element $B_{31}$ is connected to the bridging element $B_{32}$ via a ring line of the third relief ring 33, the bridging element $B_{32}$ to the bridging element $B_{32}$ via a further ring line of the third relief ring 33 and this bridging element $B_{32}$ again to the bridging element $B_{34}$ via the ring line of the third relief ring 33. Furthermore, there are ring lines between the bridging elements $B_{21}$ to $B_{25}$ of the second relief ring 32 and the bridging elements $B_{31}$ to $B_{34}$ of the third relief ring 33. The bridging element $B_{31}$ of the third relief ring 33 is connected via ring lines to the bridging elements $B_{21}$ and $B_{22}$ of the second relief ring 32, the bridging element $B_{32}$ of the third relief ring 33 to the bridging elements $B_{22}$ and $B_{23}$ of the second relief ring, bridging element $B_{33}$ of the third relief ring 33 to the bridging elements $B_{23}$ and $B_{24}$ of the second relief ring 32 and bridging element $B_{34}$ of the third relief ring 33 via ring lines to the bridging elements $B_{24}$ and $B_{25}$ of the second relief ring.

The first relief ring 31 represents a higher-order relief ring relative to the second and third relief rings. A segment of a relief ring is formed by bridging elements which are inserted between two lower-order relief ring bridging elements. For example, the bridging element $B_{13}$ of the first relief ring forms a segment which is inserted between the bridging elements $B_{23}$ and $B_{24}$ of the second relief ring.

The distribution of the cells over the relief rings is carried out in the following manner. The bridging elements of the second and third relief rings 32 and 33 respectively, transfer a cell to a bridging element of a higher-order relief ring if the cell can be transferred direct to a network interface without taking an alternate route. This means that a cell is fed to a higher-order bridging element if the transfer of the cell to the destination address (a network interface) can be effected via a minimum number of bridging elements.

For example, a cell is produced by the network interface N1, which cell is to arrive at network interface N8. The following strategy is then used. From the network interface N1 the cell is applied to the bridging element $B_{11}$ and from there to the bridging element $B_{22}$ and then to the bridging element $B_{32}$. From bridging element $B_{32}$ the cell could be applied via the bridging elements $B_{23}$ and $B_{13}$ to the network interface N6. From the network interface N6 the cell then arrives at the network interface N8 via the network interface N7 and the bridging element $B_{14}$. When this route is followed, the cells are transferred from the bridging element $B_{32}$ of the lower-order relief ring 33 to network interface N8 via three bridging elements $B_{23}$, $B_{13}$ and $B_{14}$. This route does not use a minimum number of bridging elements to reach the destination (network interface N8) while coming from the lower-order relief ring 33.

Following the above distribution strategy, a cell is transferred from the bridging element $B_{32}$, via a ring line of the third relief ring 33, to the bridging element $B_{33}$. From here the cell can be transferred via the bridging elements $B_{24}$ and $B_{14}$ to the network interface N8.

Figure 3:
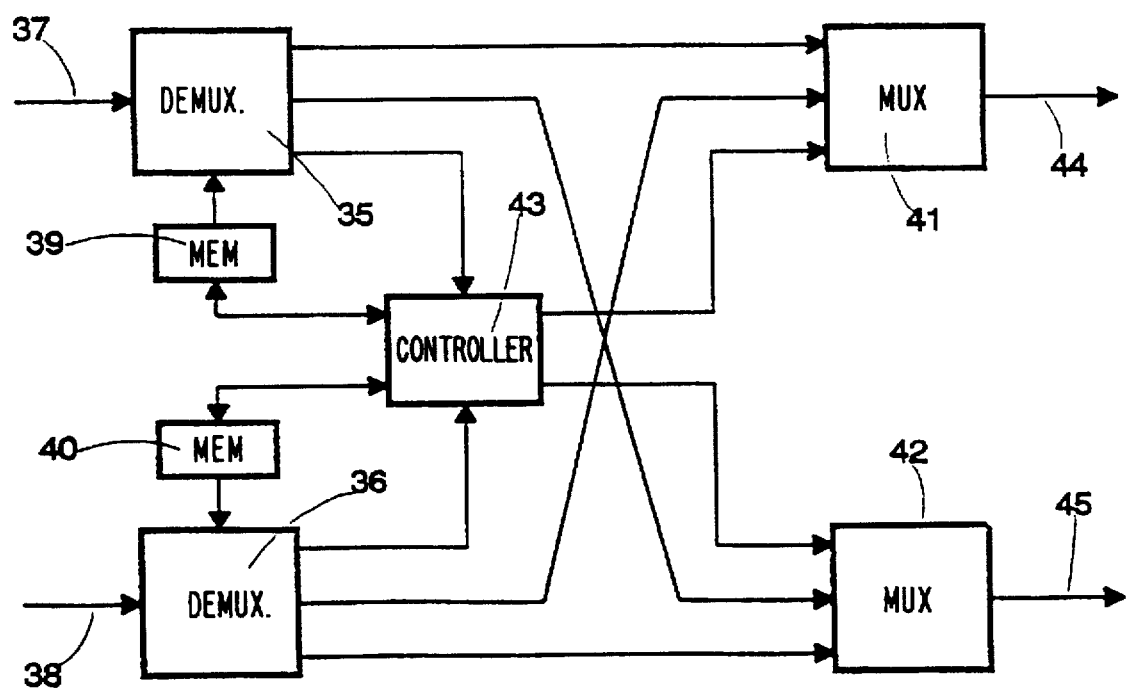
FIG. 3 shows a bridging element to be used in the drawing FIGS. 1 and 2.

FIG. 3 shows an embodiment of a bridging element which can be used in the embodiments shown in FIGS. 1 and 2. The bridging element comprises two demultiplexers 35 and 36 which are connected to the input ring lines 37 and 38. The demultiplexer 35 or 36 extracts the address from an incoming cell, which address is located in the header field of the cell and then decides on the basis of a routing Table which is contained in the memories 39 and 40 connected to the demultiplexers 35 and 36 respectively, where the cell is to be transferred to. Specific bits in the header field of the cell are reserved for the destination address.

The demultiplexer 35 is connected via lines to multiplexers 41 and 42 and to a controller 43. The demultiplexer 36 is also connected via further lines to the multiplexers 41 and 42 and the controller 43. For example, if a cell arrives over the input ring line 37 and contains a control information signal for the controller 43, the demultiplexer 35 transfers this cell to the controller 43. Furthermore, cells coming from the demultiplexer 35 and containing payload can reach either multiplexer 41 or multiplexer 42. The same holds for the demultiplexer 36. In the multiplexers 41 and 42 the cell stream is conveyed to an output ring line 44 or 45 respectively.

Control information signals which arrive at the controller 43 may be used, for example, for updating the routing Tables contained in the memories 39 and 40. For this purpose, the controller 43 each time exchanges the information signals contained in the routing Table.

The demultiplexers 35 and 36 as well as the multiplexers 41 and 42 may be formed, for example, by circuit arrangements described in German Patent Applications 40 12 768 or 37 43 685. The controller 43 may comprise, for example, a microprocessor.

What is claimed is:

1. A local network for transferring data between a plurality of stations, comprising:
   a main ring formed by a plurality of network interfaces, each of said network interfaces coupled to a corresponding station; and
   a plurality of first bridge elements coupled in series to form a first relief ring, at least one of said first bridge elements being inserted in said main ring between two respective network interfaces,
   wherein a total number of said bridge elements in said first relief ring is less than a total number of network interfaces in said main ring.

2. The local network as claimed in claim 1, wherein each of said network interfaces is arranged for sending and receiving respective packets which contain data and a destination of the packet, wherein respective said network interfaces located between two of said first bridge elements in said main ring define a segment which is a connected segment for one of said two of said first bridge elements, and wherein each of said first bridge elements is arranged for transferring a given packet received from another one of said first bridge elements, or received from one of said network interfaces to an output main ring line when said destination of said given packet is one of said network interfaces of the connected segment.

3. The local network as claimed in claim 2, wherein said network interfaces and assigned stations in each said segment in said main ring are configured in a substantially one to one correspondence with one another.

4. The local network as claimed in claim 2, further including a plurality of second bridge elements coupled in series to form a second relief ring, wherein at least one of said second bridge elements is interposed between predetermined ones of said first bridge elements of said first relief ring.

5. The local network as claimed in claim 4, wherein one of said first bridge elements of said first relief ring transfers said packet to one of said second bridge elements of said second relief ring when the transfer of said packet to a destination can be performed through a minimum number of said first and said second bridge elements.

6. The local network as claimed in claim 5, wherein the total number of said first bridge elements in said first relief ring is one less than a total number of said second bridge elements in said second relief ring.

7. The local network as claimed in claim 1, wherein said data is transferred as cells in an asynchronous transfer mode by at least one station and a respective one of said network interfaces.

8. The local network as claimed in claim 7, wherein each of said first and second bridge elements includes:
   demultiplexing means for receiving said cells; and
   control means coupled to said demultiplexing means for reading the address from a header field of an incoming cell of said cells and for transferring said incoming cell to a respective one of a plurality of multiplexers in response to the address.

9. The local network as claimed in claim 8, wherein each of said first and second bridge elements further comprises:
   a memory coupled to said demultiplexing means, said memory containing a routing table,
   wherein said demultiplexing means assigns said incoming cell to the respective one of said multiplexers using the routing table.

10. The local network as claimed in claim 9, wherein each of said first and second bridge elements further comprises a controller responsive to incoming ones of said cells which contains control information, wherein the controller updates the routing table in response to the control information.

11. A local network for transferring data between a plurality of stations, comprising:
    a plurality of first bridge elements coupled in series via relief lines to form a first relief ring;
    a plurality of network interfaces grouped into a plurality of segments via main lines to form a main ring,
    wherein each of said segments includes at least two of said network interfaces,
    wherein substantially all of said network interfaces are coupled to respective ones of the stations;
    wherein each one of said first bridge elements serially connects adjacent ones of said segments in said main ring via said main lines, and
    wherein a total number of said bridge elements in said first relief ring is less than a total number of network interfaces in said main ring.

12. The local network as claimed in claim 11, wherein each of said network interfaces is arranged for sending and receiving respective packets which contain data and a destination of the packet, and wherein one of the segments adjacent to a given one of said first bridge elements is a connected segment, and said given one of said first bridge elements is arranged for transferring a given packet received from another one of said first bridge elements, or received from one of said network interfaces, to an output main line when said destination of said given packet is one of the respective said network interfaces in said connected segment.

13. The local network as claimed in claim 12, further comprising:
    a plurality of second bridge elements coupled in series by second ring lines to form a second relief ring,
    wherein at least one of said second bridge elements serially couples adjacent ones of said first bridge elements via said relief lines of said first relief ring.

14. The local network as claimed in claim 13, wherein one of said first bridge elements of said first relief ring transfers said packet received from one of said first bridge elements to one of said second bridge elements of said second relief ring when the transfer of said packet to a destination can be performed through fewer of said first and second bridge elements than of said first bridge elements alone.

15. The local network as claimed in claim 14, wherein the total number of said first bridge elements in said first relief ring is one less than a total number of said second bridge elements forming said second relief ring.

16. The local network as claimed in claim 11, wherein said data is transferred as cells in an asynchronous transfer mode by at least one station and a respective one of said network interfaces.

17. The local network as claimed in claim 16, wherein each of said first and second bridge elements includes:
    demultiplexing means for receiving said cells; and
    control means, coupled to said demultiplexing means, for reading an address from a header field of an incoming one of said cells, and for transferring this respective incoming one of said cells to a selected one of a plurality of multiplexers in response to the address.

18. The local network as claimed in claim 17, wherein each of said first and second bridge elements further comprises:

a memory coupled to said demultiplexing means, said memory containing a routing table, wherein said demultiplexing means correlates the address to the selected one of said multiplexers using the routing table.

19. The local network as claimed in claim 18, wherein each of said first and second bridge elements further comprises:

a controller for recognizing ones of said cells which contain control information, wherein said controller updates said routing table in response to said control information.

20. A local network for transferring data between approximately N stations, comprising:

M first bridge elements coupled in series by relief lines to form a first relief ring;

N network interfaces grouped into P segments by main lines to form a main ring;

wherein each one of said M first bridge elements serially connects adjacent ones of said P segments in said main ring via further main lines, wherein M, N and P are all integers greater than 1, wherein M<N, and wherein $N \leq P+1$.

21. The local network as claimed in claim 20, further comprising:

R second bridge elements coupled in series by second ring lines to form a second relief ring, wherein one of said R second bridge elements serially couples adjacent ones of said M first bridge elements via said relief lines of said first relief ring, and wherein R=M+1.

* * * * *